April 21, 1931.  S. T. ALLEN  1,801,834

AIRCRAFT

Filed Dec. 26, 1929

INVENTOR
S.T. ALLEN
BY *Hazard and Miller*
ATTORNEYS

Patented Apr. 21, 1931

1,801,834

UNITED STATES PATENT OFFICE

SHERMAN T. ALLEN, OF BEVERLY HILLS, CALIFORNIA

AIRCRAFT

Application filed December 26, 1929. Serial No. 416,503.

This invention relates to aviation, and has for an object the provision of a novel type of aircraft possessed of several features of construction resulting in an unusually efficient, economical, and safe design of aircraft which is of such a nature that it is capable of flying with extremely high speed, and yet is capable of taking off and alighting by moving in a substantially vertical direction only; with the result that it requires a relatively small space for landing or taking off.

A more detailed object is the provision of an aircraft in which many of the advantages of lighter-than-air craft or dirigibles are combined with those of heavier-than-air craft, such as airplanes.

Another object is to construct an aircraft including an airfoil and preferably a plurality of dirigibles, or airships, which are lighter than air, in which the parts are so proportioned that the total weight of the aircraft is substantially equal to the total weight of the air displaced thereby. Moreover, driving means for the aircraft are provided, which are capable not only of propelling it in horizontal flight, but which are also capable of being adjusted to direct their slip stream vertically downwards; with the result that they are capable also of moving the aircraft upwards in a substantially vertical line, as well as causing the aircraft to settle downwards in a substantially vertical direction. In this manner, taking off from, and alighting upon landing fields or their equivalent, of relatively small size, are made possible.

A further object is to so arrange the various portions of the aircraft that an unusual degree of efficiency in bracing the ship is attained, resulting in extreme rigidity and strength, which adds to the inherent ability of the aircraft to withstand severe shocks such as those to which it will occasionally be subjected in landing and in flight during stormy weather.

A still further object is the construction of an aircraft possessed of the above detailed advantages, which is also so constructed as to afford ample space for the accommodation of passengers, crew, and baggage.

A still further object is to provide an aircraft of the general class described, which may be constructed so as to permit it to land upon, or take off from either land or water, or both.

The invention possesses other objects and advantageous features, some of which, with those enumerated, will be set forth in the following description of the invention's particular embodiment which is illustrated in the drawings accompanying and forming a part of the specification.

Referring to the drawings.

Figure 3:
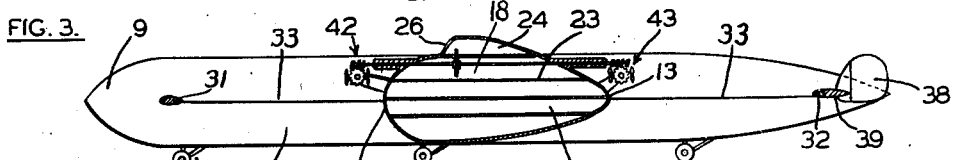
Fig. 3 is a longitudinal, vertical, medial sectional view, the plane of section being indicated by the line 3—3 of Fig. 1, and the direction of view by the arrows.

Specifically describing that embodiment of the invention which appears to be the most practical, it is constructed to include a plurality—preferably a pair—of elongated airships 6 and 7, retained in spaced, parallel relationship by being rigidly connected to a transversely extending airfoil 8. Each of the airships 6 and 7, and the airfoil 8, are suitably streamlined so as to offer the least resistance against the motion of the aircraft through the air in a horizontal direction. For this purpose the forward ends 9 of the airships 6 and 7 are rounded, whereas the after ends 11 taper gradually to a point, and the airfoil 8 is of gradually diminishing thickness from adjacent the leading edge 12 thereof, to the after edge 13, the leading edge 12 being rounded as best shown upon Fig. 3.

Each of the airships 6 and 7, is intended to have a certain degree of buoyancy. For this purpose they are designed either to have the air exhausted from the interiors thereof, or to have the air therein displaced by some suitable gas which is lighter than air—such for example, as hydrogen, or helium. Preferably they are each constructed in a manner similar to the design of that type of lighter-than-air aircraft known as the dirigible.

Figure 1:
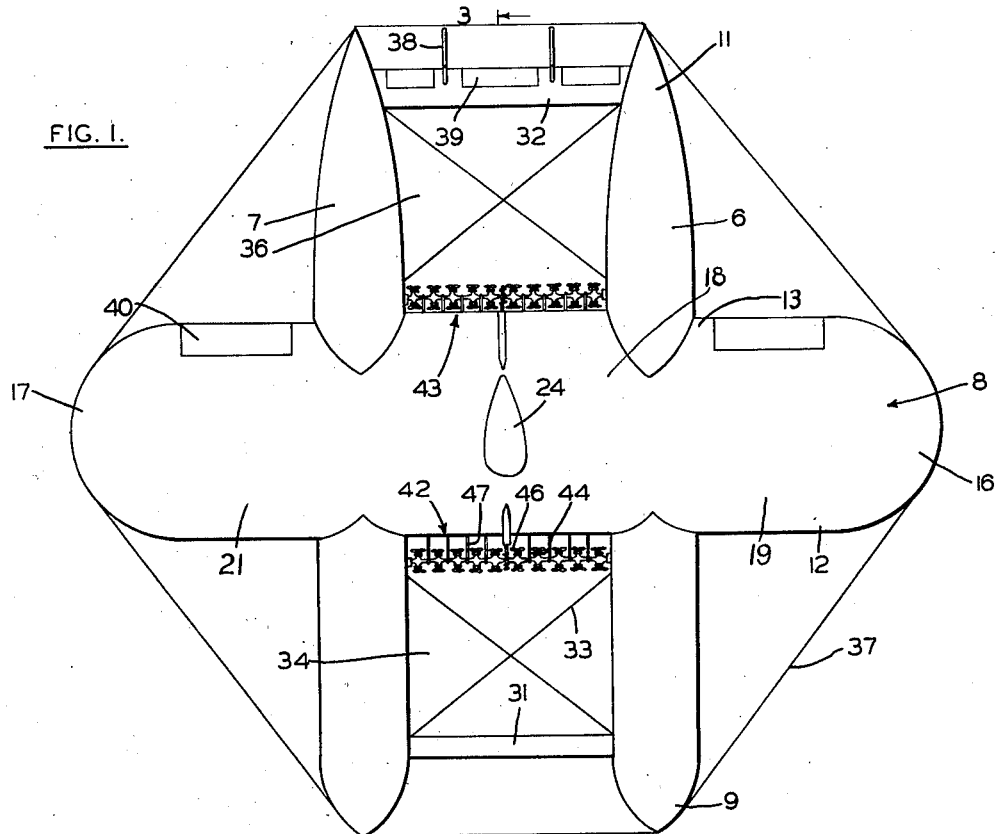
Figure 1 is a top plan view of an aircraft constructed in accordance with the principles of the present invention.
Figure 2:
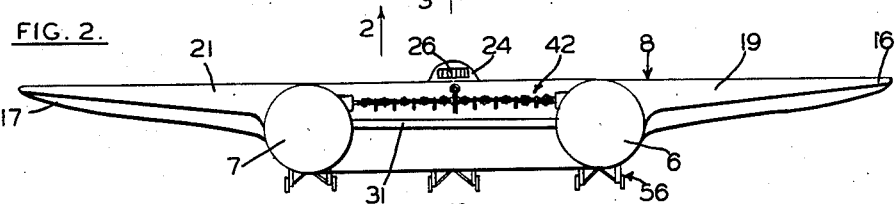
Fig. 2 is a front elevation, the direction of view being indicated by the arrow 2 of Fig. 1. The landing-gear is shown extended.

The airfoil 8 intersects both airships 6 and 7 intermediate the ends 9 and 11 thereof, with the ends 16 and 17 of the airfoil 8 extending laterally beyond the airships, as clearly shown upon Fig. 1. That portion 18 of the airfoil 8, which is between the airships 6 and 7, preferably corresponds in thickness to the radius of the airships, whereas the laterally extending portions 19 and 21 are of gradually diminished thickness as they approach the ends 16 and 17 respectively, as clearly shown upon Fig. 2. In the present embodiment, the airfoil 8 is not depended upon to add to the buoyancy of the entire aircraft. Instead, a plurality of compartments 22 are provided in the central portion 18 of the airfoil 8, and/or in the laterally extending portions 19 and 21 thereof. These compartments 22 may be utilized for the accommodation of passengers and crew, or for the stowage of baggage.

Inasmuch as I contemplate constructing the aircraft of the present invention, of relatively great size, it is entirely within the scope of the present invention to define the compartments 22 by a plurality of decks 23 spaced one above the other. Certain of the compartments 22 may be employed for the storage of fuel, but I prefer to utilize compartments in the laterally extending portions 19 and 21 of the airfoil 8, for this purpose, because of the greater accessibility of the compartments 22 within the central portion 18, and the consequent greater convenience afforded thereby when these central compartments are employed for the accommodation of passengers, and baggage.

A pilot house 24 preferably projects slightly above the upper surface of the airfoil 8 intermediate the two airships 6 and 7. Suitable windows 26 may be constructed in the pilot house 24; and all the controls for maneuvering the ship and controlling it during flight, are centralized within the pilot house 24 in accordance with the customary design of aircraft.

One of the important features to be considered in connection with aircraft constructed in accordance with the principles of the present invention, lies in the adaptability of such an aircraft for the incorporation therewith, of such bracing that an extremely great rigidity of the entire ship is attained. Each of the airships 6 and 7, as well as the airfoil 8, is rigid within itself, as will readily be understood; and in order to impart rigidity to the assembled structure, I prefer to employ rigid struts 31 and 32 extending transversely of the aircraft, between the airships 6 and 7 adjacent the forward ends 9 and after ends 11 thereof, respectively. These struts 31 and 32 are to be so joined with the inner construction of the airships 6 and 7, that in reality, they integrally unite the two airships 6 and 7, and are thus capable of imparting the greatest possible degree of rigidity to the entire structure. Still greater strength may be attained by extending guy wires 33 diagonally across the forward and after spaces 34 and 36 respectively, defined by the struts, the airships and the airfoil. Furthermore, a brace 37 completely encircles the entire aircraft. This brace may be of any suitable design, either in the form of a cable or any suitable girder construction, its only requirement being that it be longitudinally inelastic, and that it is firmly joined to the ends 9 and 11 of both airships 6 and 7, and also to the ends 16 and 17 of the airfoil 8. It is readily apparent therefore, that this system of braces and guy wires imparts a much greater degree of rigidity to my improved type of airship, than that which is present in any of the conventional airships, whether of the lighter-than-air or heavier-than-air class.

A plurality of vertical rudders 38 are operatively mounted upon the after strut 32, as are also preferably a plurality of horizontal rudders 39. Furthermore, ailerons 40 may be mounted in the trailing edge 13 of the airfoil, to facilitate the proper handling of the aircraft during flight. All the rudders 38 and 39 and the ailerons 40, are to be connected by suitable mechanism (not shown) to the appropriate controls situated in the pilot house 24.

The means for driving the aircraft, are preferably in the form of forward and after banks 42 and 43 respectively, of motors 44 and propellers 46. Each of these banks 42 and 43, is supported by means of a plurality of arms 47 extending from the trailing and leading edges of the airfoil 8, between the airships 6 and 7. A shaft 48 is journalled in the outermost ends of each group of arms 47, each shaft carrying a worm wheel 49 enmeshed by a worm 51, which, in turn, is carried by a shaft 52 which extends into the airfoil 8, and is provided with suitable mechanism (not shown) accessible within the pilot house 24, whereby each of the shafts 52 may be rotated. Whereas the shafts 52 associated with each of the forward and after banks 42 and 43 of driving means, may be rigidly connected to each other, I prefer to have them so mounted that they are capable of being independently rotated.

Between each pair of arms 47, a motor 44 is mounted upon each side of the shaft 48; and each motor 44 has a propeller 46 operatively coupled to the shaft 53 thereof. The axes of all the shafts 53 of each bank 42, 43, are disposed in perpendicularity with that of the main shaft 48, but in parallelism with each other; and the motors 44 and propellers 46 upon opposite sides of the main shaft 48, are so arranged as to direct their slip streams in a common direction. This may be attained by utilizing propellers 46 of the same pitch, and turning the oppositely facing motors in opposite directions; or by rotating the motors in the same direction and utilizing propellers of opposite pitch. As a result, the slip streams of all the propellers 46 of each bank 42, 43, combine into a single slip stream of relatively large proportions and capable of developing a great force to propel the aircraft through the air.

Figure 4:
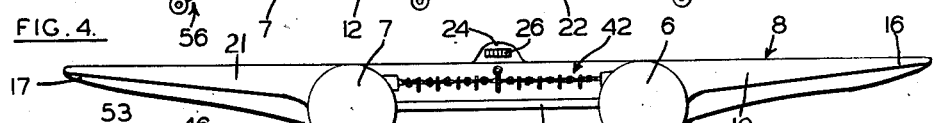
Fig. 4 is a view similar to Fig. 2, showing the landing-gear retracted so as to permit the aircraft to come to rest upon, or take off from the water.
Figure 5:
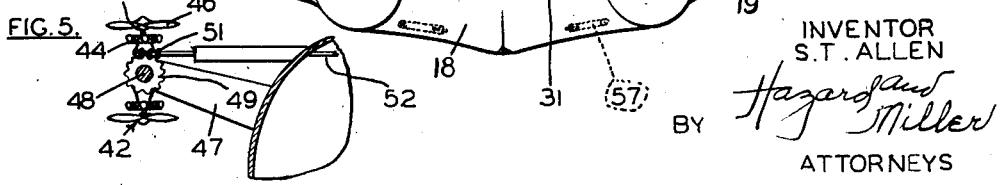
Fig. 5 is an enlarged detail view in longitudinal, vertical section, showing the manner of mounting the driving means for the aircraft.

The aircraft is also provided with a plurality of sets 56 of landing-gear, which are preferably capable of being folded upwards into the body of the aircraft, as indicated in dashed lines at 57 upon Fig. 4. This permits the aircraft to be brought to rest upon, or to take off from either land or water; with the result that it is of the amphibian type; it being understood that when the craft is to alight upon, or take off from the land, the landing-gear 56 shall be extended as shown upon Fig. 2; and when a landing is to be made upon the water, the landing gear 56 shall be folded into the body of the machine, as shown upon Fig. 4.

Owing to the fact that the combined lifting power of the airships 6 and 7, is sufficient to make the entire aircraft weigh substantially the same as the total amount of air displaced, thereby, it is possible to arise vertically from the land or water, upon which it is resting. When a flight is to be started, the shafts 52 are rotated so as to dispose the axes of the shafts 53 of both banks 42 and 43 of motors and propellers, vertically; then by energizing the motors 44, the propellers 46 may be made to revolve; it being understood of course, that the direction of rotation is such that the slip streams from both banks of propellers, are directed downwards. The number and size of motors 44 employed, are such that the total force generated thereby, is sufficient to overcome whatever excess weight the aircraft plus its passengers, crew, baggage, and fuel, may have as compared to the lifting power of the airships 6 and 7; with the result that the entire ship may be lifted from the ground or water, as will readily be understood. When sufficient altitude has been attained, the shafts 52 should again be rotated to dispose the axes of the motors 44 and propellers 53 horizontally, whereupon the aircraft may be maneuvered in horizontal flight by means of the rudders 38 and 39, and ailerons 40.

Owing to the fact that the combined weight of the aircraft and the load carried thereby, is substantially equal to the weight of displaced air, very little of the energy of the motors is expended in maintaining the aircraft elevated. Hence, practically all the power of the motors is utilized in driving the aircraft forward; with the result that it is possible to attain a much greater speed than in the case of the conventional airplane in which at least a portion of the power of the motor or motors is expended in attaining, or maintaining altitude.

Another feature resulting from the buoyancy of the craft, is the reduced liability of having to make a forced landing in the event of failure of an appreciable number of the driving motors. A safe landing may be made, even though all of the motors 44 have ceased to function; it being understood that the buoyancy of the entire craft will permit it to settle gradually, and thus avoid the liability of damaging the ship, and/or injuring the passengers and crew as a result of a violent landing.

It is to be understood of course, that landing may be effected by bringing the craft substantially to rest in respect to its motion in a horizontal direction, and then again shifting the motors and propellers to bring their axes into a vertical position, whereupon the motors may be employed to permit the craft to settle gradually upon the chosen area. Inasmuch as practically no horizontal velocity is necessary to effect such a landing, this area may be very much smaller as in the case of landing the conventional airplane—in fact, it is entirely feasible to bring an aircraft constructed in accordance with the principles of the present invention, to rest upon the roof of an ordinary building, or any other area of similar dimensions, and which has previously been impractical to employ as an aviation field.

It is to be understood that the details of the invention as herein disclosed, are subject to alteration within the spirit or scope of the appended claims.

I claim:

1. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, and a longitudinally inelastic brace encircling said aircraft and connected to the ends of said airships and airfoil.

2. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, a longitudinally inelastic brace encircling said aircraft and connected to the ends of said airships and airfoil, and bracing connecting the ends of said airships.

3. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, driving means carried by said aircraft, a strut rigidly joining one end of each airship with the corresponding end of the other airship, and a rudder operatively mounted upon the strut connecting the after ends of the airships.

4. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, driving means carried by said aircraft between said airships, a strut rigidly joining one end of each airship with the corresponding end of the other airship, and a rudder operatively mounted upon the strut connecting the after ends of the airships, said rudder being disposed within the slip stream of said driving means.

5. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, driving means carried by said aircraft, a strut rigidly joining one end of each airship with the corresponding end of the other airship, a rudder operatively mounted upon the strut connecting the after ends of the airships, and a longitudinally inelastic brace encircling said aircraft and connected to the ends of said airships and airfoil.

6. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, driving means carried by said aircraft between said airships, a strut rigidly joining one end of each airship with the corresponding end of the other airship, a rudder operatively mounted upon the strut connecting the after ends of the airships, said rudder being disposed within the slip stream of said driving means, and a longitudinally inelastic brace encircling said aircraft and connected to the ends of said airships and airfoil.

7. In an aircraft, the combination of a plurality of rigid airships, an airfoil rigidly joining said airships and retaining them with their longitudinal axes in parallelism with each other, the total weight of said aircraft being substantially equal to the weight of the air displaced thereby, a bank of motors and propellers pivotally mounted between extended ends of said airships, and means for swinging said bank through 90° to position the axes of rotation of said propellers optionally horizontally or vertically.

8. In an aircraft, the combination of a plurality of rigid airships, an airfoil rigidly joining said airships and retaining them with their longitudinal axes in parallelism with each other, the total weight of said aircraft being substantially equal to the weight of the air displaced thereby, a shaft journalled transversely of said aircraft between extended ends of said airships, a plurality of motors carried by said shaft, a propeller associated with each motor, and means for imparting rotary movement to said shaft to vary the direction of the slip stream of said propellers with respect to said aircraft.

9. In an aircraft, the combination of a plurality of rigid airships, an airfoil rigidly joining said airships and retaining them with their longitudinal axes in parallelism with each other, the total weight of said aircraft being substantially equal to the weight of the air displaced thereby, a shaft journalled transversely of said aircraft between extended ends of said airships, a plurality of propellers journalled on said shaft for rotation about axes perpendicular to said shaft and parallel to each other, means for driving said propellers, and means for imparting rotary movement to said shaft to vary the direction of the slip stream of said propellers with respect to said aircraft.

10. In an aircraft, the combination of a plurality of rigid airships, an airfoil rigidly joining said airships and retaining them with their longitudinal axes in parallelism with each other, the total weight of said aircraft being substantially equal to the weight of the air displaced thereby, a shaft journalled transversely of said aircraft between extended ends of said airships, a plurality of propellers journalled on said shaft for rotation about axes perpendicular to said shaft and parallel to each other, means for driving said propellers, means for imparting rotary movement to said shaft to vary the direction of the slip stream of said propellers with respect to said aircraft, and a plurality of rudders mounted between the after ends of said airships and disposed within said slip stream during horizontal flight of the aircraft.

11. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, a longitudinally inelastic brace encircling said aircraft and connected to the ends of said airships and airfoil, the total weight of said aircraft being substantially equal to the weight of the air displaced thereby, and means for elevating said aircraft and driving it in horizontal flight.

12. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, a longitudinally inelastic brace encircling said aircraft and connected to the ends of said airships and airfoil, the total weight of said aircraft being substantially equal to the weight of the air displaced thereby, a shaft journalled transversely of said aircraft between extended ends of said airships, a plurality of motors carried by said shaft, a propeller associated with each motor, and means for imparting rotary movement to said shaft to vary the direction of the slip stream of said propellers with respect to said aircraft.

13. In an aircraft, the combination of a plurality of elongated rigid airships disposed in spaced parallel relationship, an airfoil extending laterally in respect to said airships and intersecting both airships intermediate the ends thereof with the ends of said airfoil extending beyond the airships, a longitudinally inelastic brace encircling said aircraft and connected to the ends of said airships and airfoil, the total weight of said aircraft being substantially equal to the weight of the air displaced thereby, a shaft journalled transversely of said aircraft between extended ends of said airships, a plurality of propellers journalled on said shaft for rotation about axes perpendicular to said shaft and parallel to each other, means for driving said propellers, and means for imparting rotary movement to said shaft to vary the direction of the slip stream of said propellers with respect to said aircraft.

In testimony whereof I have signed my name to this specification.

SHERMAN T. ALLEN.